US010354600B2

(12) United States Patent
Min et al.

(10) Patent No.: US 10,354,600 B2
(45) Date of Patent: Jul. 16, 2019

(54) LIQUID CRYSTAL DISPLAY DEVICE AND METHOD OF DRIVING THE SAME

(71) Applicant: Samsung Display Co., Ltd., Yongin-si, Gyeonggi-do (KR)

(72) Inventors: Byung-kyou Min, Seoul (KR); Youngsup Kwon, Gwangmyeong-si (KR); Taegon Im, Gwangmyeong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 118 days.

(21) Appl. No.: 15/158,395

(22) Filed: May 18, 2016

(65) Prior Publication Data

US 2017/0053606 A1 Feb. 23, 2017

(30) Foreign Application Priority Data

Aug. 20, 2015 (KR) ........................ 10-2015-0117428

(51) Int. Cl.
*G09G 3/32* (2016.01)
*G09G 3/36* (2006.01)
(Continued)

(52) U.S. Cl.
CPC ......... *G09G 3/3426* (2013.01); *G09G 3/2022* (2013.01); *G09G 3/36* (2013.01);
(Continued)

(58) Field of Classification Search
CPC .. G09G 3/3426; G09G 3/2022; G09G 3/2025; G09G 2320/0646;
(Continued)

(56) References Cited

U.S. PATENT DOCUMENTS 7,762,703 B2 * 7/2010 Bohme .................. G02B 6/006 345/7
8,368,637 B2 * 2/2013 Choi .................... G09G 3/3426 345/102
(Continued)

FOREIGN PATENT DOCUMENTS

KR 10-2010-0131916 A 12/2010
KR 10-2011-0042528 A 4/2011
(Continued)

*Primary Examiner* — Sardis F Azongha
(74) *Attorney, Agent, or Firm* — Lewis Roca Rothgerber Christie LLP

(57) ABSTRACT

According to some embodiments of the inventive concept, there is provided a liquid crystal display device including a backlight including a light source configured to emit first to N-th block lights respectively to first to N-th sub-frames, in a first direction, the first to N-th sub-frames being obtained by dividing a frame in time, and a display panel including pixels arranged in a matrix form and grouped into first to N-th row blocks along the first direction, the pixels being configured to display an image using the first to N-th block lights, and operations of the first to N-th row blocks being respectively synchronized with the first to N-th sub-frames, wherein a brightness of a K-th block light among the first to N-th block lights is determined on a basis of light source brightness data of a K-th row block among the first to N-th row blocks.

11 Claims, 9 Drawing Sheets

(51) Int. Cl.
*G09G 3/34* (2006.01)
*G09G 3/20* (2006.01)

(52) U.S. Cl.
CPC ... *G09G 2310/08* (2013.01); *G09G 2330/021* (2013.01); *G09G 2360/16* (2013.01)

(58) Field of Classification Search
CPC ..... G09G 2320/0686; G09G 2320/103; G09G 2330/021; G09G 2360/16; G02F 1/1336; G02F 1/133611; G02F 1/133615; G02B 6/0001
See application file for complete search history.

(56) References Cited

U.S. PATENT DOCUMENTS 9,019,317 B2 * 4/2015 Lee .................... G09G 3/3406 345/690
2003/0030633 A1 * 2/2003 Chou .................... G09G 3/342 345/212
2006/0146005 A1 * 7/2006 Baba .................... G09G 3/3233 345/102
2008/0284947 A1 * 11/2008 Li .................... G02F 1/133609 349/73
2008/0309611 A1 * 12/2008 Yang .................... G09G 3/3426 345/102
2009/0179849 A1 * 7/2009 Wu .................... G09G 3/3426 345/102
2010/0253615 A1 * 10/2010 Han .................... G09G 3/3426 345/102
2010/0253881 A1 * 10/2010 Han .................... G02F 1/133615 349/65
2011/0001693 A1 1/2011 Kim et al.
2012/0032990 A1 * 2/2012 Li .................... G09G 3/3426 345/690
2012/0200485 A1 8/2012 Uchibe
2013/0050240 A1 * 2/2013 Nakamura ............. G09G 3/342 345/589
2016/0203774 A1 * 7/2016 Ahn .................... G09G 3/3426 345/102
2017/0004777 A1 * 1/2017 Imamura ................ G09G 3/342

FOREIGN PATENT DOCUMENTS

KR 10-2011-0080580 A 7/2011
KR 10-2013-0071227 A 6/2013

* cited by examiner

<First Sub-Frame (F_SUB1)>

<Second Sub-Frame (F_SUB2)>

LIQUID CRYSTAL DISPLAY DEVICE AND METHOD OF DRIVING THE SAME

CROSS-REFERENCE TO RELATED APPLICATION

This application claims priority to and the benefit of Korean Patent Application No. 10-2015-0117428, filed on Aug. 20, 2015, in the Korean Intellectual Property Office, the content of which is incorporated herein by reference in its entirety.

BACKGROUND

1. Field

Aspects of the present disclosure relate to a liquid crystal display device and a method of driving the same.

2. Description of the Related Art

As one kind of a flat panel display device, a liquid crystal display device is widely applied to a variety of image information processing devices, such as television sets, monitors, notebook computers, mobile phones, and the like, to display an image.

The liquid crystal display device controls intensity of electric fields applied to liquid crystal molecules interposed between two substrates and controls a level (e.g., an intensity or a luminance) of light passing through the two substrates, thereby displaying the image. The liquid crystal display device includes a liquid crystal display panel for displaying the image and includes a backlight for providing the liquid crystal display panel with the light.

The backlight is classified into an edge-illumination type (kind) backlight and a direct-illumination type (type) backlight according to a position of a light source emitting the light. The edge-illumination type (kind) backlight includes a light guide plate and the light source for providing the light to a side surface of the light guide plate, and the direct-illumination type (kind) backlight includes a diffusion plate and the light source for providing the light to a lower surface of the diffusion plate.

SUMMARY

Aspects of some embodiments of the present disclosure are directed toward a liquid crystal display device capable of reducing power consumption thereof.

Aspects of some embodiments of the present disclosure are directed to a method of driving the liquid crystal display device.

According to some embodiments of the inventive concept, there is provided a liquid crystal display device including: a backlight including a light source configured to emit first to N-th block lights respectively to first to N-th sub-frames (N being a natural number equal to or greater than 1), in a first direction, the first to N-th sub-frames being obtained by dividing a frame in time, and a display panel including pixels arranged in a matrix form and grouped into first to N-th row blocks along the first direction, the pixels being configured to display an image using the first to N-th block lights, and operations of the first to N-th row blocks being respectively synchronized with the first to N-th sub-frames, wherein a brightness of a K-th block light (K being a natural number equal to or greater than 1 and equal to or less than N) among the first to N-th block lights is determined on a basis of light source brightness data of a K-th row block among the first to N-th row blocks.

In an embodiment, the light source brightness data of the K-th row block include information about a highest brightness among brightnesses corresponding to pixels of the K-th row block.

In an embodiment, the light source further includes first to M-th light sources (M being a natural number equal to or greater than 1) arranged in a second direction substantially perpendicular to the first direction, the pixels being grouped into first to M column blocks along the second direction, wherein an L-th fight source (L being a natural number equal to or greater than 1 and equal to or less than M) among the first to M-th light sources is configured to emit a light to an L-th column block among first to M-th column blocks, and wherein a brightness of a K-th block light of the L-th light source is determined on a basis of light source brightness data of a K-row-L-column pixel block defined corresponding to an area in which the K-th row block overlaps with the L-th column block.

In an embodiment, the light source is spaced from one end of the display panel by a distance along the first direction, and the light source is configured to provide the first to N-th block lights to the one end of the display panel.

In an embodiment, a first light source of the light source is spaced from the one end along a third direction opposite to the first direction, and is configured to emit the first to N-th block lights toward the one end in the first direction, and wherein a second light source of the light source is spaced from an other end facing the one end of the display panel along the first direction and is configured to emit the first to N-th block lights toward the other end in the third direction.

In an embodiment, the liquid crystal display device further including a light guide plate, wherein the light source faces a light incident surface of the light guide plate and is configured to emit the first to N-th block lights toward the light incident surface.

In an embodiment, the pixels arranged in the row blocks, except for the K-th row block, are configured to display a black image during a K-th sub-frame from among the first to N-th sub-frames.

In an embodiment, the liquid crystal display device further including first to N-th sub-gate drivers configured to apply gate control signals to the first to N-th row blocks, wherein, during the K-th sub-frame, the sub-gate drivers, except for a K-th sub-gate drivers among the first to N-th sub-gate drivers, are configured to apply a turn-off voltage to the row blocks, except for the K-th row blocks.

In an embodiment, the liquid crystal display device further including first to N-th gate drivers configured to apply gate signals to the first to N-th row blocks and a data driver, wherein each of the first to N-th gate drivers is configured to apply a turn-on voltage to a corresponding row block of the first to N-th row blocks, and the data driver is configured to apply a black data voltage corresponding to the black image to the row blocks, except for the K-th row block, during the K-th sub-frame.

According to some embodiments of the inventive concept, there is provided a method of driving a liquid crystal display device, the method including: determining a brightness of a K-th block light (K being a natural number equal to or greater than 1 and equal to or less than N) among first to N-th block lights (N being a natural number equal to or greater than 1) on a basis of light source brightness data of a K-th row block among first to N-th row blocks of a display panel, the display panel being configured to display an image in a unit of first to N-the sub-frames during a K-th sub-frame among the first to N-th sub-frames, the first to N-th sub-frames being obtained by dividing a frame in time, and the first to N-th row blocks being arranged in a first direction; emitting the K-th block light toward the display panel in the first direction during the K-th sub-frame; and displaying an image through the K-th row block utilizing the K-th block light during the K-th sub-frame.

In an embodiment, the light source brightness data of the K-th row block include information about a highest brightness among brightnesses corresponding to pixels of the K-th row block.

In an embodiment, the method further including displaying a black image through pixels arranged in the row blocks, except for the K-th row block, during the K-th sub-frame.

In an embodiment, the displaying of the black image includes applying, during the K-th sub-frame, a turn-off voltage to the row blocks, except for the K-th row block, utilizing gate drivers, except for a K-th gate driver among first to N-th gate drivers.

In an embodiment, the displaying of the black image includes: applying a turn-on voltage to each of the first to N-th row blocks utilizing first to N-th gate drivers; and applying a black data voltage corresponding to the black image to the row blocks, except for the K-th row block, utilizing first to N-th gate drivers during the K-th sub-frame.

According to the above exemplary embodiments, the first and second light sources are adaptively dimmed more than achievable by one-dimensional local dimming, which uses the edge type (kind) light source, and thus power consumption in the two-dimensional local dimming system/method may be less than that in the one-dimensional local dimming system/method. In addition, because the number of the light sources included in the edge-illumination type (kind) backlight is smaller than that in the direct-illumination type (kind) backlight operated in the local dimming mode, the power consumption in the backlight is less than the power consumption in the direct-illumination type (kind) backlight operated in the local dimming mode.

BRIEF DESCRIPTION OF THE DRAWINGS

The above and other advantages of the present disclosure will become readily apparent by reference to the following detailed description when considered in conjunction with the accompanying drawings wherein.

DETAILED DESCRIPTION

It will be understood that unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having meanings that are consistent with their meaning in the context of the relevant art and will not be interpreted in an idealized or overly formal sense unless expressly so defined herein.

Hereinafter, the present invention will be explained in more detail with reference to the accompanying drawings.

Figure 1:
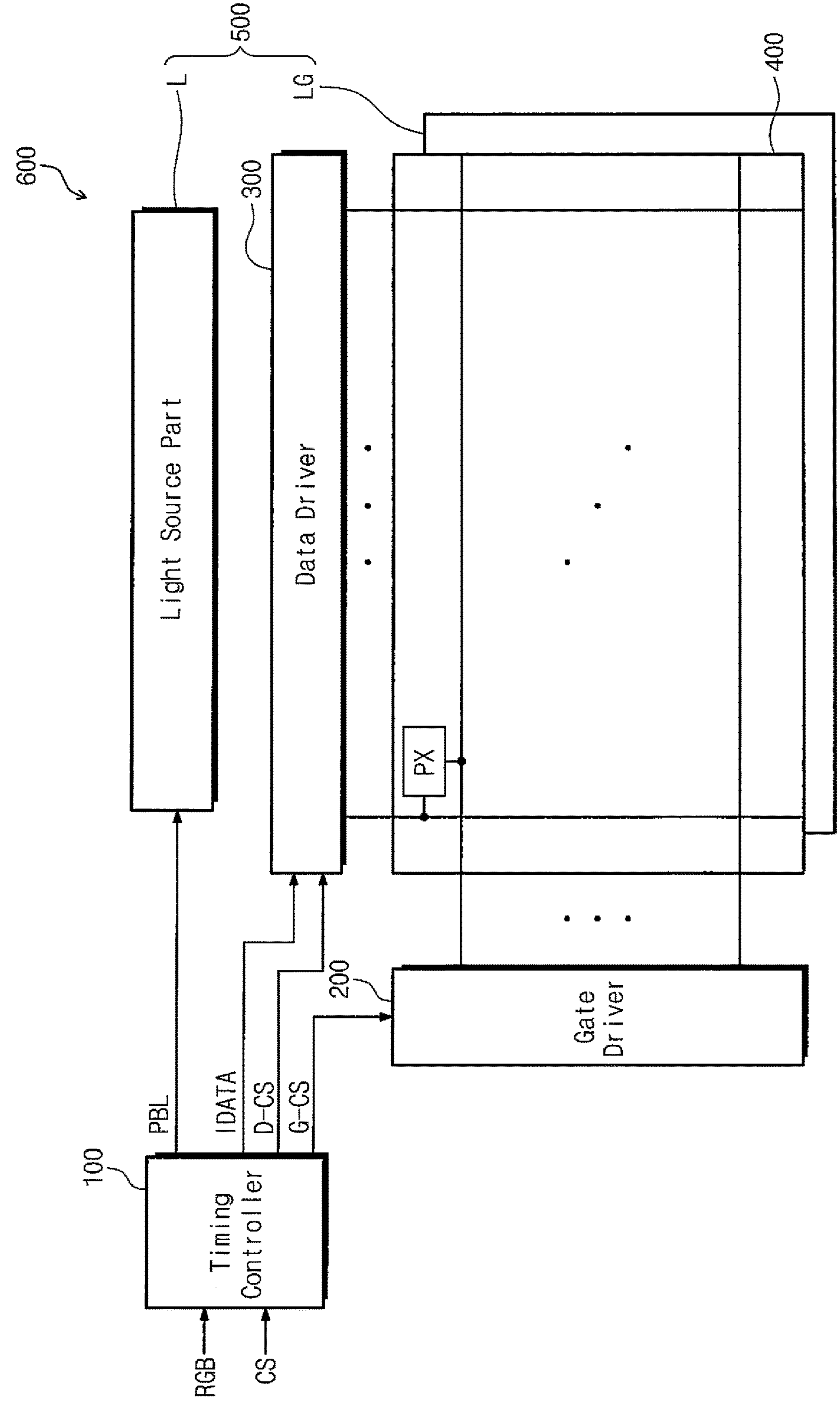
FIG. 1 is a block diagram showing a liquid crystal display device according to an exemplary embodiment of the present disclosure.

FIG. 1 is a block diagram showing a liquid crystal display device 600 according to an exemplary embodiment of the present disclosure.

Referring to FIG. 1, the liquid crystal display device 600 includes a display panel 400 for displaying an image, a panel driver for driving the display panel 400, and a backlight 500 for providing a light to the display panel 400. The panel driver includes a gate driver 200, a data driver 300, and a timing controller 100 for controlling a drive of the gate driver 200 and the data driver 300.

The display panel 400 includes a plurality of gate lines GL1 to GLi, a plurality of data lines DL1 to DLj, and a plurality of pixels PX. The gate lines GL1 to GLi extend in a row direction and are arranged in a column direction to be substantially parallel to each other. The data lines DL1 to DLj extend in the column direction and are arranged in the row direction to be substantially parallel to each other.

Each of the pixels PX includes a thin film transistor and a liquid crystal capacitor. Each of the pixels PX displays a red, green, or blue color.

The timing controller 100 receives RGB image signals RGB and control signals CS from the outside of the liquid crystal display device 600 (e.g., an external circuit). The timing controller 100 converts the RGB image signals RGB to output image data IDATA and light source brightness data PBL in consideration of an interface between the data driver 300 and the timing controller 100. The output image data IDATA are applied to the data driver 300 and the light source brightness data PBL are applied to the backlight 500. The control signals CS include a data control signal D-CS and a gate control signal G-CS, the data control signal D-CS is applied to the data driver 300, and the gate control signal G-CS is applied to the gate driver 200.

The timing controller 100 performs a frequency multiplying operation. The timing controller 100 multiplies a fundamental frequency of a frame. That is, the timing controller 100 divides the frame into a first sub-frame to an N-th sub-frame in time and generates the output image data IDATA, the light source brightness data PBL, and driving signals, which correspond to (e.g., are appropriate for) the first sub-frame to the N-th sub-frame. In the present exemplary embodiment, "N" is a natural number equal to or greater than 2.

The gate driver 200 sequentially outputs gate signals in response to the gate control signal G-CS provided from the timing controller 100.

The data driver 300 converts the output image data IDATA to data voltages in response to the data control signal D-CS provided from the timing controller 100. The data voltages are applied to the display panel 400. Accordingly, the pixels PX are turned on in response to the gate signals, and the turned-on pixels PX receive the data voltages to display the image with desired grayscale level.

The backlight 500 includes a light source block (e.g., a light source part) L and a light guide plate LG.

The light source block L includes a plurality of light sources. The light source block L is disposed adjacent to one end of the display panel 400.

The light guide plate LG has a substantially rectangular plate shape. The light guide plate LG includes a plastic material and/or the like. The light provided to the light guide plate LG exits from the light guide plate LG along a direction substantially orthogonal to a direction in which the light is incident on the light guide plate. Consequently, the light incident on the light guide plate LG travels to a rear surface of the display panel 400 (where the rear surface is facing oppositely away from a front surface facing a potential viewer).

The light sources are disposed adjacent to the one end of the light guide plate LG. The light sources emit the light toward the light guide plate LG.

The liquid crystal display device 600 may further include a light source driver.

The light source driver receives the light source brightness data PBL from the timing controller 100 and applies a light source driving voltage to the backlight 500, on the basis of the light source brightness data PBL, to control a brightness of the light emitted from the light source block L.

Figure 2:
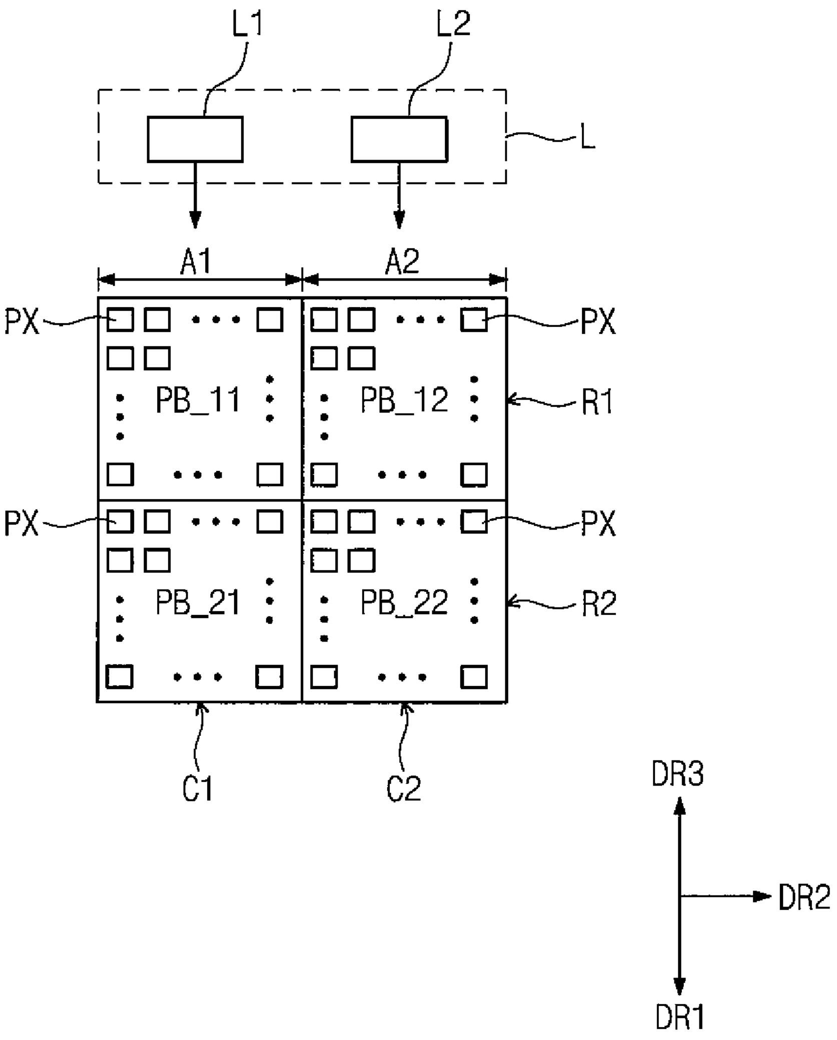
FIG. 2 is a partial view of a display panel shown in FIG. 1.

FIG. 2 is a partial view of the display panel 400 shown in FIG. 1.

Referring to FIG. 2, the display panel 400 includes first to N-th row blocks defined along (e.g., extending along) the first direction DR1. Each of the first to N-th row blocks includes a plurality of pixels PX arranged in a matrix form. In other words, the pixels PX are grouped into the first to N-th row blocks along the first direction DR1. The first to N-th row blocks have substantially the same area as each other. In the some exemplary embodiments, "N" is a natural number equal to or greater than 2.

In the present exemplary embodiment, the "N" is 2. In this case, the display panel 400 includes a first row block R1 and a second row block R2 sequentially defined along the first direction DR1.

The display panel 400 includes first to M-th column blocks defined along (e.g., extending along) a second direction DR2 substantially orthogonal to the first direction DR1. Each of the first to M-th column blocks includes a plurality of pixels PX arranged in a matrix form. The first to M-th column blocks have substantially the same area as each other. In some exemplary embodiments, "M" is a natural number equal to or greater than 2.

In the present exemplary embodiment, the "M" is 2. In this case, the display panel 400 includes a first column block C1 and a second column block C2 sequentially defined along the second direction DR2.

The light source includes a first light source L1 and a second light source L2.

The display panel 400 includes a plurality of pixel blocks defined therein. The pixel blocks are defined by the first and second row blocks R1 and R2 and the first and second column blocks C1 and C2. Hereinafter, for the convenience of explanation, the pixel block defined to correspond to an area in which a K-th row block and an L-th column block are overlapped with each other among the pixel blocks is referred to as a "K-th row and L-th column pixel block PB_KL". For instance, the pixel block corresponding to the second row block R2 and the second column block C2 among the pixel blocks is referred to as a "second row and second column pixel block PB_22". Here, the "K" is a natural number equal to or greater than 1 and equal to or less than 2 and the "L" is a natural number equal to or greater than 1 and equal to or less than 2.

In the present exemplary embodiment, the light source block L is an edge type (kind) light source block. The first and second light sources L1 and L2 of the light source block L are disposed adjacent to one end of the display panel 400 in a third direction DR3 opposite to the first direction DR1. The first and second light sources L1 and L2 are sequentially arranged in the second direction DR2. The first and second light sources L1 and L2 are disposed to correspond to the first and second column blocks C1 and C2. For instance, the first light source L1 is disposed at a position spaced apart from an upper end of the first column block C1 to the third direction DR3 by a set or predetermined distance and the second light source L2 is disposed at a position spaced apart from an upper end of the second column block C2 to the third direction DR3 by a set or predetermined distance.

The first light source L1 provides the light to a first area A1 corresponding to the first column block C1. The first area A1 receives the light provided from the first light source L1. The first column block C1 displays the image using the light provided to the first area A1.

The second light source L2 provides the light to a second area A2 corresponding to the second column block C2. The second area A2 receives the light provided from the second light source L2. The second column block C2 displays the image using the light provided to the second area A2.

Figure 3A:
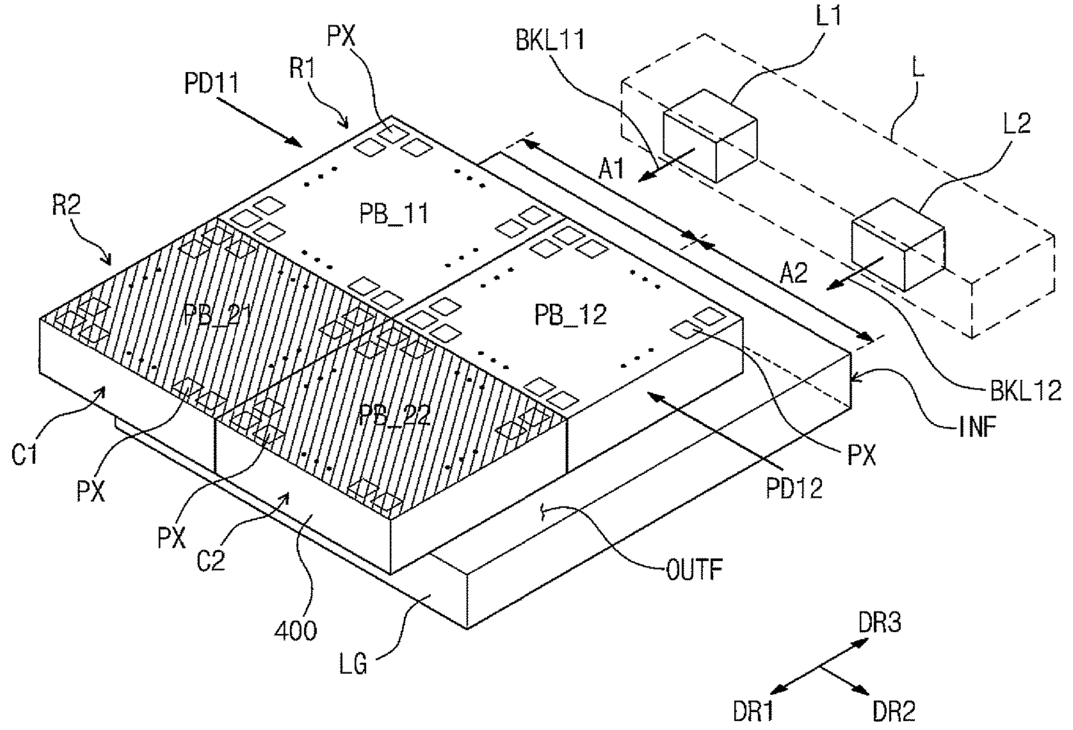
FIG. 3A is a perspective view showing an operation state of the display panel shown in FIG. 1 during a first sub-frame period.

FIG. 3A is a perspective view showing an operation state of the display panel 400 shown in FIG. 1 during a first sub-frame period.

Referring to FIG. 3A, the light guide plate LG includes a light incident surface INF and a light exit surface OUTF. The first and second light sources L1 and L2 are disposed to face (i.e., be across from or opposite to) the light incident surface INF. The light emitted from the first and second light sources L1 and L2 is incident on the light guide plate LG through the light incident surface INF. The light guide plate LG guides the light incident thereto to allow the light to travel in a direction substantially orthogonal to the rear surface of the display panel 400. In more detail, a direction in which the light emitted from the first and second light sources L1 and L2 is incident on the light guide plate LG through the light incident surface INF may be substantially orthogonal to a direction in which the light exiting through the light exit surface OUTF of the light guide plate LG travels.

As described above, the timing controller 100 divides the frame into the first sub-frame to the N-th sub-frame in time. That is, the number of the sub-frames obtained by dividing the frame is equal to the number of the row blocks.

In the present exemplary embodiment, the "N" is 2, but it should not be limited to 2. The first sub-frame F_SUB1 has substantially the same time interval as that of the second sub-frame F_SUB2, and the second sub-frame F_SUB2 starts after the end of the first sub-frame F_SUB1.

The first and second row blocks R1 and R2 are operated (e.g., driven) in synchronization with the first and second sub-frames F_SUB1 and F_SUB2, respectively. In addition, the first and second light sources L1 and L2 are operated (e.g., driven or powered) in synchronization with the first and second sub-frames F_SUB1 and F_SUB2.

In more detail, the lights emitted from the light source block L during the first sub-frame F_SUB1 are referred to as first block lights BKL11 and BKL12. That is, the lights respectively emitted from the first and second light sources L1 and L2 during the first sub-frame F_SUB1 are referred to as the first block lights BKL11 and BKL12, respectively.

The first light source L1 provides the first block light BKL11 to the first area A1 during the first sub-frame F_SUB1. The first block light BKL11 provided to the first area A1 is guided by the light guide plate LG and exits through a rear surface of the first row-first column pixel block PB_11 (where the rear surface is opposite a front surface facing a potential viewer).

The light source brightness data PBL (e.g., refer to FIG. 1) include light source brightness data PBL11 of the first row-first column pixel block PB_11, light source brightness data PBL12 of the first row-second column pixel block PB_12, light source brightness data PBL21 of the second row-first column pixel block PB_21, and light source brightness data PBL22 of the second row-second column pixel block PB_22.

The first row-first column pixel block PB_11 displays the image using the first block light BKL11 emitted from the first light source L1 during the first sub-frame F_SUB1. In more detail, the first row-first column pixel block PB_11 modulates the first block light BKL11 in response to first-first pixel data P011, which includes information about brightness of the pixels PX of the first row-first column pixel block PB_11.

The second light source L2 provides the first block light BKL12 to the second area A2 during the first sub-frame F_SUB1. The first block light BKL12 provided to the second area A2 is guided by the light guide plate LG and exits through a rear surface of the first row-second column pixel block PB_12.

The first row-second column pixel block PB_12 displays the image using the first block light BKL11 emitted from the second light source L2 during the first sub-frame F_SUB1. In more detail, the first row-second column pixel block PB_12 modulates the first block light BKL12 in response to first-second pixel data PD12, which includes information about brightness of the pixels PX of the first row-second column pixel block PB_12.

The brightness of the first block lights BKL11 and BKL12 during the first sub-frame F_SUB1 is determined on the basis of the light source brightness data PBL_11 and PBL_12 of the first row-first column pixel block PB_11 and the first row-second column pixel block PB_12. In more detail, the first and second light sources L1 and L2 receive the light source brightness data PBL_11 and PBL_12 from the timing controller 100 (e.g., refer to FIG. 1). The brightness of the lights emitted from the first and second light sources L1 and L2 is controlled on the basis of the light source brightness data PBL_11 and PBL_12 during the first sub-frame F_SUB1.

The light source brightness data PBL_11 are generated on the basis of the first-first pixel data PD11 to allow the brightness of the first block light BKL11 to correspond to the image displayed in the first row-first column pixel block PB_11. The light source brightness data PBL_11 include information about brightness corresponding to the pixels in the first row-first column pixel block PB_11. In the present exemplary embodiment, the light source brightness data PBL_11 of the first row-first column pixel block PB_11 may include information about the highest brightness among brightnesses corresponding to the pixels PX of the first row-first column pixel block PB_11.

Accordingly, the first block light BKL11 emitted from the first light source L1 has a level (e.g., an intensity or a luminance) corresponding to a light level (e.g., a light intensity and/or luminance) of the pixels PX of the first row-first column pixel block PB_11.

Consequently, the pixels PX of the first row-first column pixel block PB_11 displays original image corresponding to the first-first pixel data PD11 using the first block light BKL11 in the first sub-frame F_SUB1.

The first row-second column pixel block PB_12 is operated similar to the first row-first column pixel block PB_11 on the basis of the first-second pixel data PD12 and the first block light BKL12, and thus details thereof may not be repeated.

The first block light BKL11 provided to the first area A1 is guided by the light guide plate LG and exits through a rear surface of the second row-first column pixel block PB_21. However, because the pixels PX of the second row-first column pixel block PB_21 are operated to display a black image, the first block light BKL11 provided to the second row-first column pixel block PB_21 is blocked.

The first block light BKL12 provided to the second area A2 is guided by the light guide plate LG and exits through a rear surface of the second row-second column pixel block PB_22. However, because the pixels PX of the second row-second column pixel block PB_22 are operated to display the black image, the first block light BKL12 provided to the second row-second column pixel block PB_22 is blocked.

According to the above, only the first row block R1 is operated during the first sub-frame F_SUB1 of one frame and the first block lights BKL11 and BKL12 having the brightness corresponding to that of the first row block R1 are provided. Thus, power consumption in the first and second light sources L1 and L2 may be reduced.

Figure 3B:
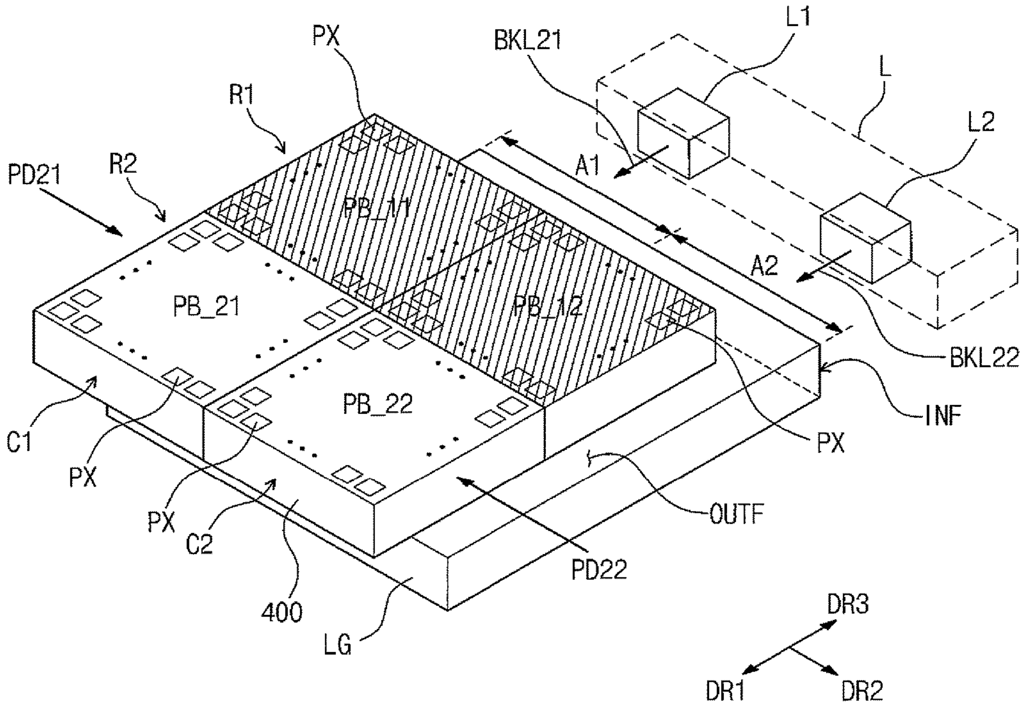
FIG. 3B is a perspective view showing an operation state of the display panel shown in FIG. 1 during a second sub-frame period.

FIG. 3B is a perspective view showing an operation state of the display panel shown in FIG. 1 during a second sub-frame period.

Referring to FIG. 3B, the lights emitted from the light source block L during the second sub-frame F_SUB2 are referred to as second block lights BKL21 and BKL22. That is, the lights respectively emitted from the first and second light sources L1 and L2 during the second sub-frame F_SUB2 are referred to as the second block lights BKL21 and BKL22, respectively.

The first light source L1 provides the second block light BKL21 to the first area A1 during the second sub-frame F_SUB2. The second block light BKL21 provided to the first area A1 is guided by the light guide plate LG and exits through a rear surface of the second row-first column pixel block PB_21.

The second row-first column pixel block PB_21 displays the image using the second block light BKL21 emitted from the first light source L1 during the second sub-frame F_SUB2. In more detail, the second row-first column pixel block PB_21 modulates the second block light BKL21 in response to second-first pixel data PD21, which includes information about brightness of the pixels PX of the second row-first column pixel block PB_21.

The second light source L2 provides the second block light BKL22 to the second area A2 during the second sub-frame F_SUB2. The second block light BKL22 provided to the second area A2 is guided by the light guide plate LG and exits through a rear surface of the second row-second column pixel block PB_22.

The second row-second column pixel block PB_22 displays the image using the second block light BKL22 emitted from the second light source L2 during the second sub-frame F_SUB2. In more detail, the second row-second column pixel block PB_22 modulates the second block light BKL22 in response to second-second pixel data PD22, which includes information about brightness of the pixels PX of the second row-second column pixel block PB_22.

The brightness of the second block lights BKL21 and BKL22 during the second sub-frame F_SUB2 is determined on the basis of the light source brightness data PBL_21 and PBL_22 of the second row-first column pixel block PB_21 and the second row-second column pixel block PB_22. In more detail, the first and second light sources L1 and L2 receive the light source brightness data PBL_21 and PBL_22 from the timing controller 100 (e.g., refer to FIG. 1). The brightness of the lights emitted from the first and second light sources L1 and L2 is controlled on the basis of the light source brightness data PBL_21 and PBL_22 during the second sub-frame F_SUB2.

The light source brightness data PBL_21 are generated on the basis of the second-first pixel data PD21 to allow the brightness of the second block light BKL21 to correspond to the image displayed in the second row-first column pixel block PB_21. In the present exemplary embodiment, the light source brightness data PBL_21 of the second row-first column pixel block PB_21 may include information about the highest brightness among brightnesses corresponding to the pixels PX of the second row-first column pixel block PB_21.

Accordingly, the second block light BKL21 emitted from the first light source L1 has a level (e.g., an intensity and/or a luminance) corresponding to a light level (e.g., a light intensity and/or luminance) of the pixels PX of the second row-first column pixel block PB_21.

Consequently, the pixels PX of the second row-first column pixel block PB_21 displays the original image corresponding to the second-first pixel data PD21 using the second block light BKL21 in the second sub-frame F_SUB2.

The second row-second column pixel block PB_22 is operated similar to the second row-first column pixel block PB_21 on the basis of the second-second pixel data PD22 and the second block light BKL22, and thus details thereof may not be repeated.

The second block light BKL21 provided to the first area A1 is guided by the light guide plate LG and exits through a rear surface of the first row-first column pixel block PB_11. However, because the pixels PX of the first row-first column pixel block PB_11 are operated to display the black image, the second block light BKL21 provided to the first row-first column pixel block PB_11 is blocked.

The second block light BKL22 provided to the second area A2 is guided by the light guide plate LG and exits through a rear surface of the first row-second column pixel block PB_12. However, because the pixels PX of the first row-second column pixel block PB_12 are operated to display the black image, the second block light BKL22 provided to the first row-second column pixel block PB_12 is blocked.

According to the above, only the second row block R2 is operated during the second sub-frame F_SUB2 of one frame and the second block lights BKL21 and BKL22 having the brightness corresponding to that of the second row block R2 are provided. Thus, the power consumption in the first and second light sources L1 and L2 may be reduced.

The liquid crystal display device 600 according to the present exemplary embodiment divides the pixels PX included in the display panel on the basis of two-dimensional pixel blocks defined by overlapping the row blocks and the column blocks (i.e., define by the crossing regions of the row and column blocks). In addition, the liquid crystal display device 600 drives the block lights on the basis of the brightness data of each pixel block. Accordingly, a two-dimensional dimming operation of the backlight 500 may be performed on the liquid crystal display device including the edge type (kind) light source block, and thus consumption of the light in the liquid crystal display device 600 including the edge type (kind) light source block may be effectively reduced.

As described above, each of the number of the sub-frames and the number of the block lights should not be limited to two and may assume any higher number that would be suitable in a given application.

Hereinafter, a method of displaying the image through the pixels PX of the display panel 400 will be described in further detail by using specific exemplary values.

Figure 3C:
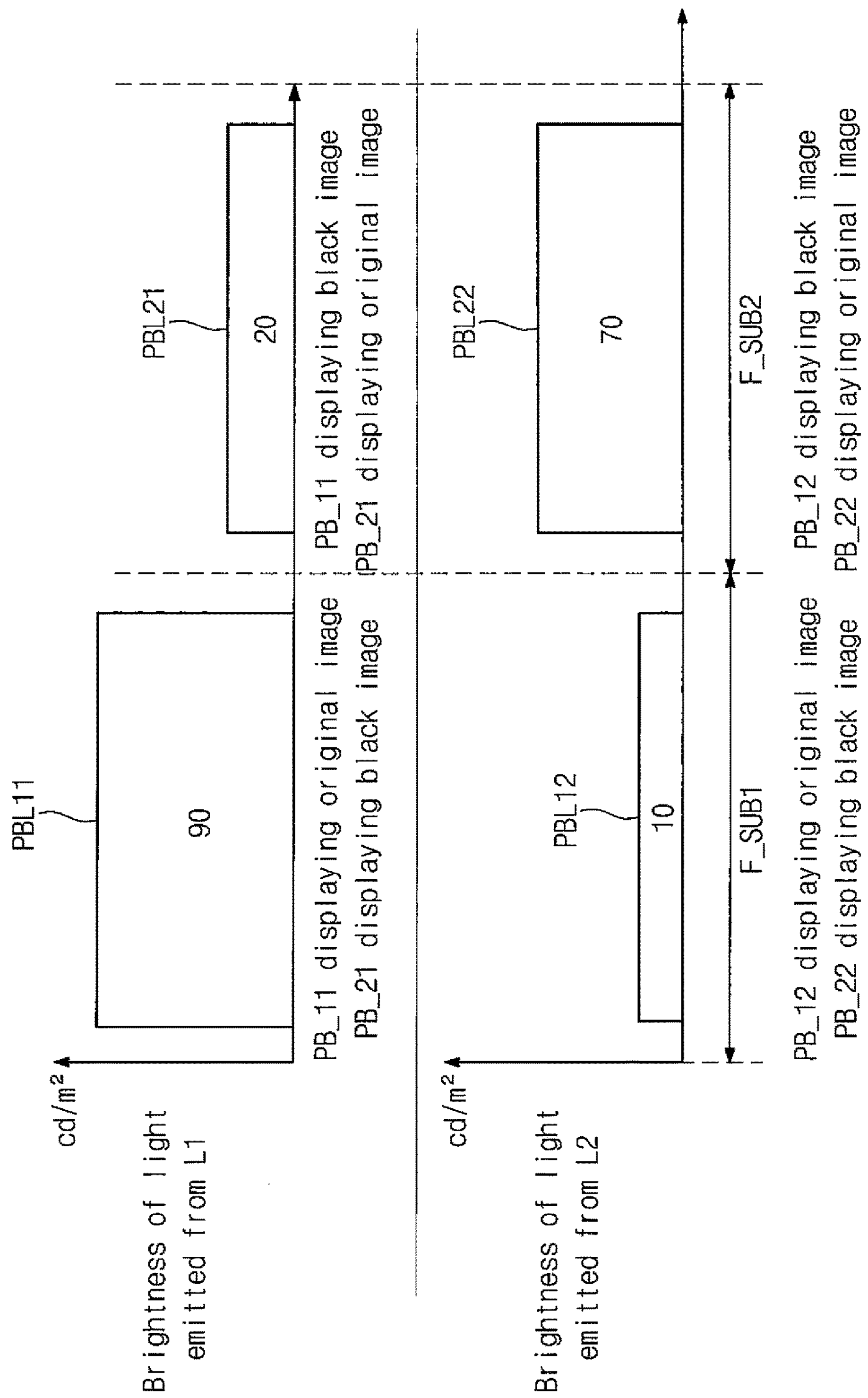
FIG. 3C is a diagram showing an operation state of the display panel shown in FIG. 1 during first and second sub-frame periods.

FIG. 3C is a diagram showing an operation state of the display panel shown in FIG. 1 during first and second sub-frame periods F_SUB1 and F_SUB2.

Referring to FIGS. 3A, 3B, and 3C, the first and second sub-frames F_SUB1 and F_SUB2 may be respectively synchronized with the first and second row blocks R1 and R2.

In the present exemplary embodiment, the light source brightness data PBL_11 of the first row-first column pixel block PB_11 is about 90 cd/$m^2$, the light source brightness data PBL_12 of the first row-second column pixel block PB_12 is about 10 cd/$m^2$, the light source brightness data PBL_21 of the second row-first column pixel block PB_21 is about 20 cd/$m^2$, and the light source brightness data PBL_22 of the second row-second column pixel block PB_22 is about 70 cd/$m^2$.

The brightnesses of the first block lights BKL11 and BKL12 in the first sub-frame F_SUB1 are about 90 cd/$m^2$ and about 10 cd/$m^2$, respectively. The first row-first column pixel block PB11 displays the original image corresponding to the first row-first column pixel block PB11 using the first block light BKL11. Similarly, the first row-second column pixel block PB12 displays the original image corresponding to the first row-second column pixel block PB12 using the first block light BKL12.

Meanwhile, as described above, the second row-first column pixel block PB21 and the second row-second column pixel block PB22 block or substantially block transmission of the first block lights BKL11 and BKL12, and display the black image during the first sub-frame F_SUB1.

The brightnesses of the second block lights BKL21 and BKL22 in the second sub-frame F_SUB2 are about 20 cd/$m^2$ and about 70 cd/$m^2$, respectively. The second row-first column pixel block PB21 displays the original image corresponding to the second row-first column pixel block PB21 using the second block light BKL21. Similarly, the second row-second column pixel block PB22 displays the original image corresponding to the second row-second column pixel block PB22 using the second block light BKL22.

Meanwhile, as described above, the first row-first column pixel block PB11 and the first row-second column pixel block PB12 block or substantially block transmission of the second block lights BKL21 and BKL22, and display the black image during the second sub-frame F_SUB2.

The brightness of the first light source L1 is reduced to about 10 cd/$m^2$ from about 90 cd/$m^2$ in the second sub-frame F_SUB2 and the brightness of the second light source L2 is reduced to about 20 cd/$m^2$ from about 70 cd/$m^2$ in the first sub-frame F_SUB1, and thus power consumption in the first and second light sources L1 and L2 may be reduced.

The method of displaying the black image through the pixels PX arranged in the first and second row blocks R1 and R2 will be described in further detail with reference to FIGS. 4 and 5.

FIG. 41*s* a view showing the method of displaying the black image through the row block according to an exemplary embodiment of the present disclosure. FIG. 4 shows only the operation in the first sub-frame F_SUB1 as a representative example.

Figure 4:
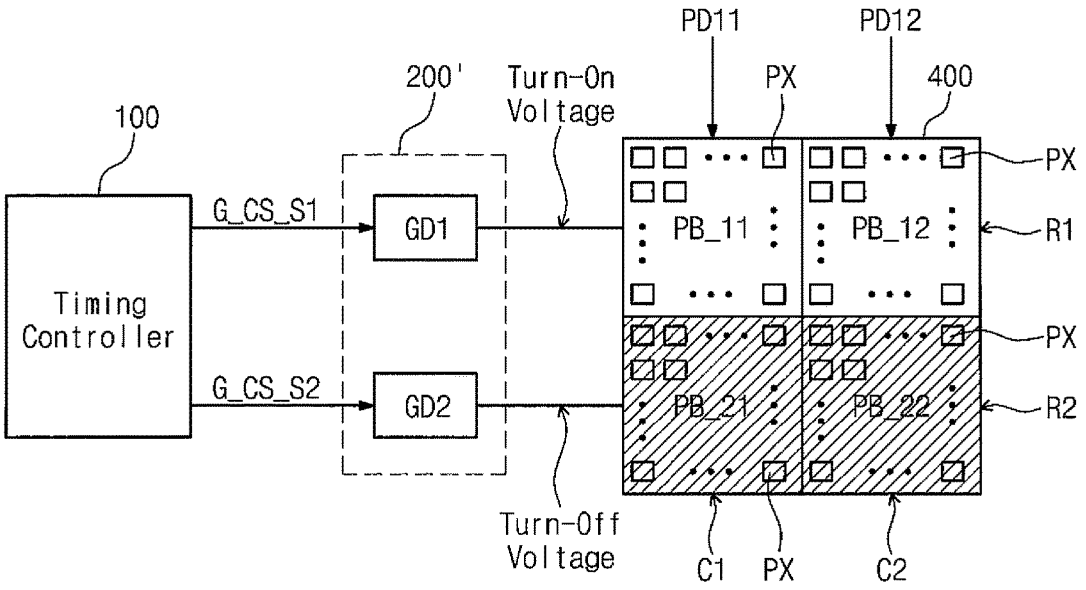
FIG. 4 is a view showing a method of displaying a black image through a row block according to an exemplary embodiment of the present disclosure.

Referring to FIG. 4, a gate driver 200' includes first and second sub-gate drivers GD1 and GD2. The first and second sub-gate drivers GD1 and GD2 are connected to the first and second row blocks R1 and R2, respectively. The gate control signal GCS includes first and second sub-gate control signals G_CS_S1 and G__ CS_S2 respectively corresponding to the first and second sub-gate drivers GD1 and GD2.

The first and second sub-gate drivers GD1 and GD2 receive the first and second sub-gate control signals G_CS_S1 and G_CS_S2 from the timing controller 100, respectively. The first and second sub-gate drivers GD1 and GD2 control the image display in the first and second row blocks R1 and R2 in response to the first and second sub-gate controls G_CS_S1 and G_CS_S2, respectively.

The first sub-gate driver GD1 applies a turn-on voltage to the first row block R1 in the first sub-frame F_SUB1. Accordingly, transistors of the pixels PX of the first row block R1 are turned on and the pixels PX of the first row block R1 are respectively charged with data voltages corresponding to the first-first pixel data PD11 and the first-second pixel data PD12. Consequently, the first row-first column pixel block PB_11 and the first row-second column pixel block PB_12 display original images respectively corresponding to the first-first pixel data PD11 and the first-second pixel data PD12 during the first sub-frame F_SUB1.

The second sub-gate driver GD2 applies a turn-off voltage to the second row block R2 in the first sub-frame F_SUB1. Therefore, transistors of the pixels PX of the second row block R2 are turned off. In this case, the first block lights BKL11 and BKL12 (e.g., refer to FIG. 3A) provided to the second row-first column pixel block PB21 and the second row-second column pixel block PB_22 are blocked or substantially blocked from transmission. Consequently, the pixels PX arranged in the second row-first column pixel block PB_21 and the second row-second column pixel block PB_22 display the black image.

The second sub-gate driver GD2 applies a turn-on voltage to the second row block R2 in the second sub-frame F_SUB2. Accordingly, transistors of the pixels PX of the second row block R2 are turned on and the pixels PX of the second row block R2 are respectively charged with data voltages corresponding to the second-first pixel data PD21 and the second-second pixel data PD22. Consequently, the second row-first column pixel block PB_21 and the second row-second column pixel block PB_22 display original images respectively corresponding to the second-first pixel data PD21 and the second-second pixel data PD22 during the second sub-frame F_SUB2.

The first sub-gate driver GD1 applies a turn-off voltage to the first row block R1 in the second sub-frame F_SUB2. Therefore, transistors of the pixels PX of the first row block R1 are turned off. In this case, the second block lights BKL21 and BKL22 (e.g., refer to FIG. 3B) provided to the first row-first column pixel block PB11 and the first row-second column pixel block PB_12 are blocked or substantially blocked from transmission. Consequently, the pixels PX arranged in the first row-first column pixel block PB_11 and the first row-second column pixel block PB_12 display the black image.

Figure 5:
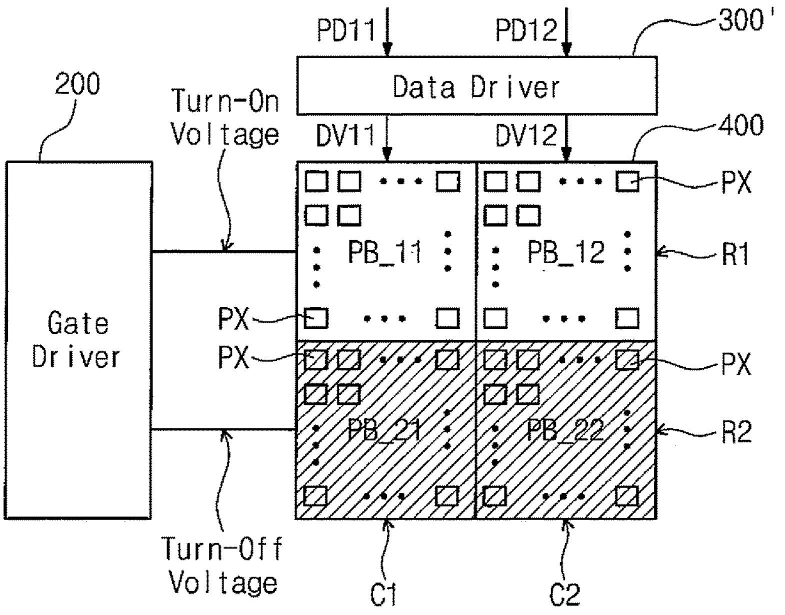
FIG. 5 is a view showing a method of displaying a black image through a row block according to another exemplary embodiment of the present disclosure.

FIG. 5 is a view showing a method of displaying a black image through a row block according to another exemplary embodiment of the present disclosure. FIG. 5 shows only the method of displaying the black image through the row block in the first sub-frame F_SUB1 as a representative example.

Referring to FIG. 5, the gate driver 200 is connected to the first and second row blocks R1 and R2. The gate driver 200 applies the turn-on voltage to the first and second row blocks R1 and R2 in the first sub-frame F_SUB1.

The data driver 300' receives the first-first pixel data PD11 and the first-second pixel data PD12 and converts the first-first pixel data PD11 and the first-second pixel data PD12 to a first-first data voltage DV11 and a first-second data voltage DV12, respectively, during the first sub-frame F_SUB1. Then, the data driver 300' applies the first-first and first-second data voltages DV11 and DV12 to the pixels PX of the first row-first column pixel block PB_11 and the first row-second column pixel block PB_12, respectively.

The data driver 300' applies a black data voltage corresponding to the black image to the pixels PX of the second row-first column pixel block PB_21 and the second row-second column pixel block PB_22. The black data voltage may be a data voltage corresponding to a black grayscale level (or zero grayscale level).

Consequently, the pixels PX of the first row-first column pixel block PB_11 and the first row-second column pixel block PB_12 receive the turn-on voltage and the data voltage of the original image to display the original image, and the pixels PX of the second row-first column pixel block PB_21 and the second row-second column pixel block PB_22 receive the turn-on voltage and the data voltage of the black image to display the black image.

The method of displaying the black image in the row block in the second sub-frame F_SUB2 is similar to that of the first sub-frame F_SUB1, and thus detailed descriptions thereof may not be described.

Figure 6:
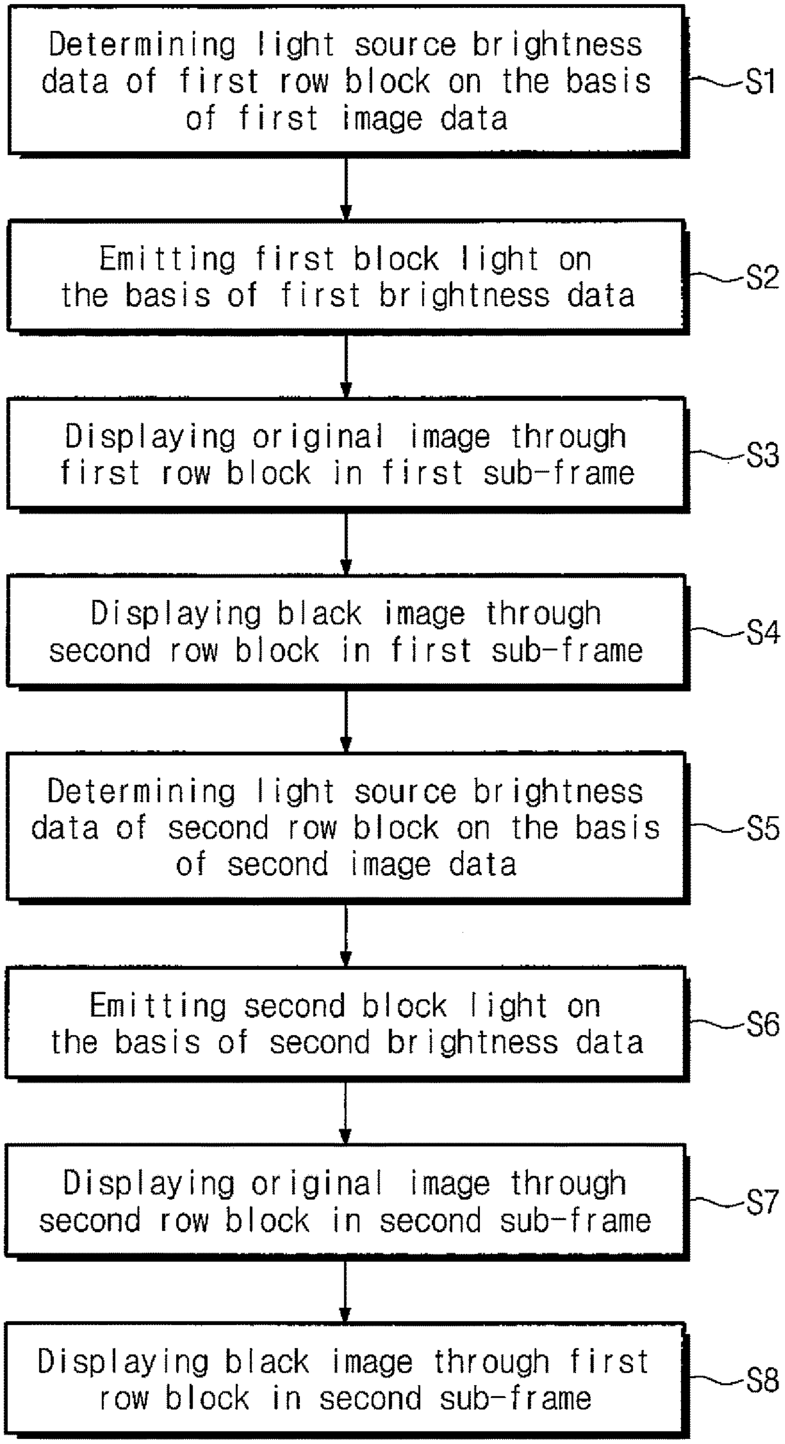
FIG. 6 is a flow diagram showing a method of driving a liquid crystal display device according to an exemplary embodiment of the present disclosure.

FIG. 6 is a flow diagram showing a method of driving a liquid crystal display device according to an exemplary embodiment of the present disclosure.

Referring to FIGS. 3A, 3B, and 6, the light source brightness data PBL11 and PBL12 of the first row block RI are determined on the basis of first image data of the first row block R1 in the first sub-frame F_SUB1 (S1). The first image data include the first-first and first-second pixel data PD11 and PD12.

Then, the brightnesses of the first block lights BKL11 and BKL12 are determined on the basis of the light source brightness data PBL11 and PBL12 of the first row block R1 and the first block lights BKL11 and BKL12 having the determined brightnesses are output (S2).

The pixels PX of the first row block R1 displays the original image using the first block lights BKL11 and BKL12 during the first sub-frame F_SUB1 (S3). In more detail, the pixels PX of the first row block R1 may display the original image by modulating the first block lights BKL11 and BKL12 on the basis of the first image data.

Meanwhile, the pixels PX of the second row block R2 display the black image during the first sub-frame F_SUB1 (S4).

The light source brightness data PBL21 and PBL22 of the second row block R2 are determined on the basis of second image data of the second row block R2 in the second sub-frame F_SUB2 (S5). The second image data include the second-first and second-second pixel data PD21 and PD22.

Then, the brightnesses of the second block lights BKL21 and BKL22 are determined on the basis of the light source brightness data PBL21 and PBL22 of the second row block R2 and the second block lights BKL21 and BKL22 having the determined brightnesses are output (S6).

The pixels PX of the second row block R2 displays the original image using the second block lights BKL21 and BKL22 during the second sub-frame F_SUB2 (S7). In more detail, the pixels PX of the second row block R2 may display the original image by modulating the second block lights BKL21 and BKL22 on the basis of the second image data.

Meanwhile, the pixels PX of the first row block R1 display the black image during the second sub-frame F_SUB2 (S8).

The method of displaying the black image is as described above.

According to the above, the pixels PX of the first row-first column pixel block PB_11 and the first row-second column pixel block PB_12 display the original image during the first sub-frame F_SUB1, and the pixels PX of the second row-first column pixel block PB_21 and the second row-second column pixel block PB_22 display the original image during the second sub-frame F_SUB2. Therefore, the image corresponding to one frame may be displayed over two sub-frames.

In addition, the brightness of the first and second light sources L1 and L2 is controlled to correspond to the first row-first column pixel block PB_11 and the first row-second pixel block PB_12 in the first sub-frame F_SUB1, and controlled to correspond to the second row-first column pixel block PB_21 and the second row-second pixel block PB_22 in the second sub-frame F_SUB2. Accordingly, the two-dimensional local dimming may be achieved using the edge type (kind) light source block.

Therefore, the first and second light sources L1 and L2 are adaptively dimmed, with respect to the image data, more than one-dimensional local dimming using the edge type (kind) light source, and thus power consumption in the two-dimensional local dimming system/method may be less than that in the one-dimensional local dimming system/method. In addition, because the number of the light sources included in the edge-illumination type (kind) backlight 500 is less than that in the direct-illumination type (kind) backlight 500 operated in the local dimming mode, the power consumption in the backlight 500 is less than the power consumption in the direct-illumination type (kind) backlight 500 operated in the local dimming mode.

Figure 7:
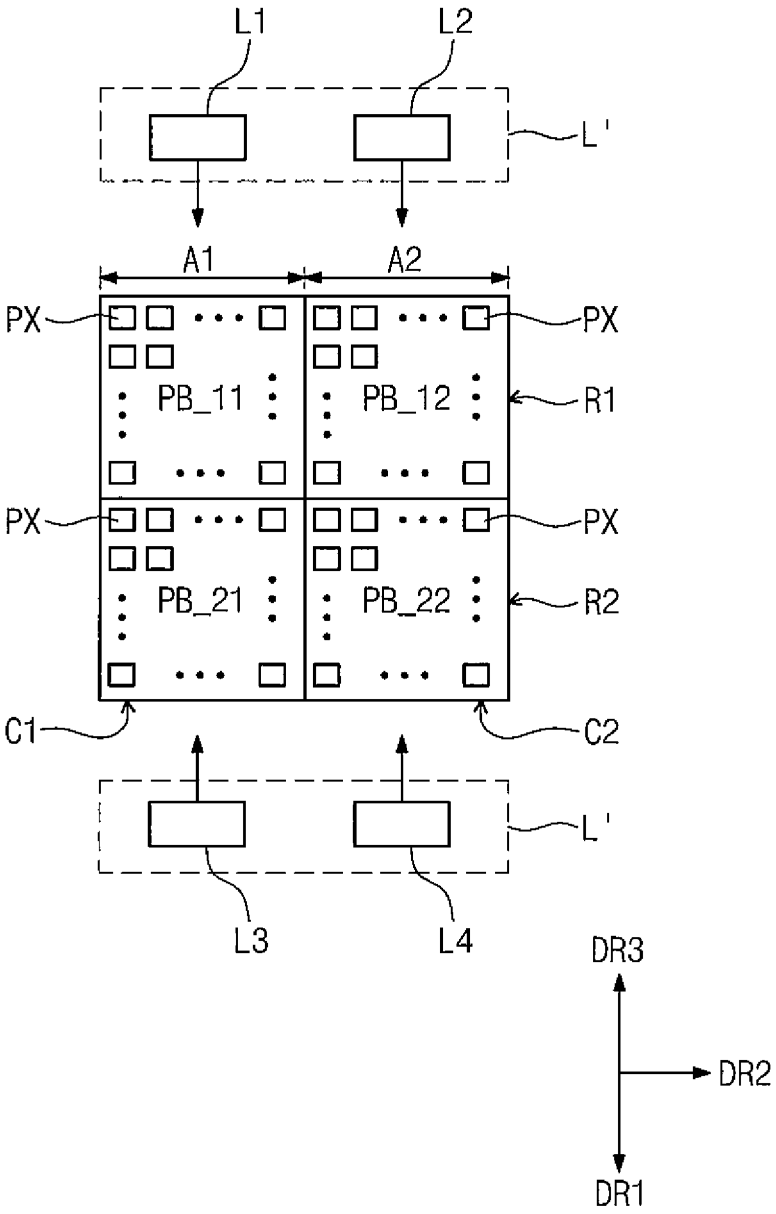
FIG. 7 is a view showing a display panel according to another exemplary embodiment of the present disclosure.

FIG. 7 is a view showing a display panel according to another exemplary embodiment of the present disclosure.

Referring to FIG. 7, the light source block L' is disposed adjacent to one end of the display panel 400 and the other end substantially parallel to the one end of the display panel 400. For instance, the light source block L' includes first, second, third, and fourth light sources L1, L2, L3, and L4. In more detail, the light source block L' shown in FIG. 7 further includes the third and fourth light sources L3 and L4 when compared with the light source block shown in FIG. 2. Hereinafter, only the third and fourth light sources L3 and L4 will be additionally described and details of the first and second light sources L1 and L2 may not be repeated.

The third and fourth light sources L3 and L4 are disposed to respectively face (e.g., be opposite from) the first and second light sources L1 and L2. For instance, the third light source L3 is disposed spaced apart from a lower end of the first column block C1 in the first direction DR1 by a set or predetermined distance, and the fourth light source L4 is disposed spaced apart from a lower end of the second column block C2 in the first direction DR1 by a set or predetermined distance.

As described above, because the light source block L' shown in FIG. 7 further includes the third and fourth light sources L3 and L4, the light source block L' shown in FIG. 7 may effectively provide the light to the second row-first column pixel block PB21 and the second row-second column pixel block PB22 when compared with the light source block L' shown in FIG. 2.

Figure 8:
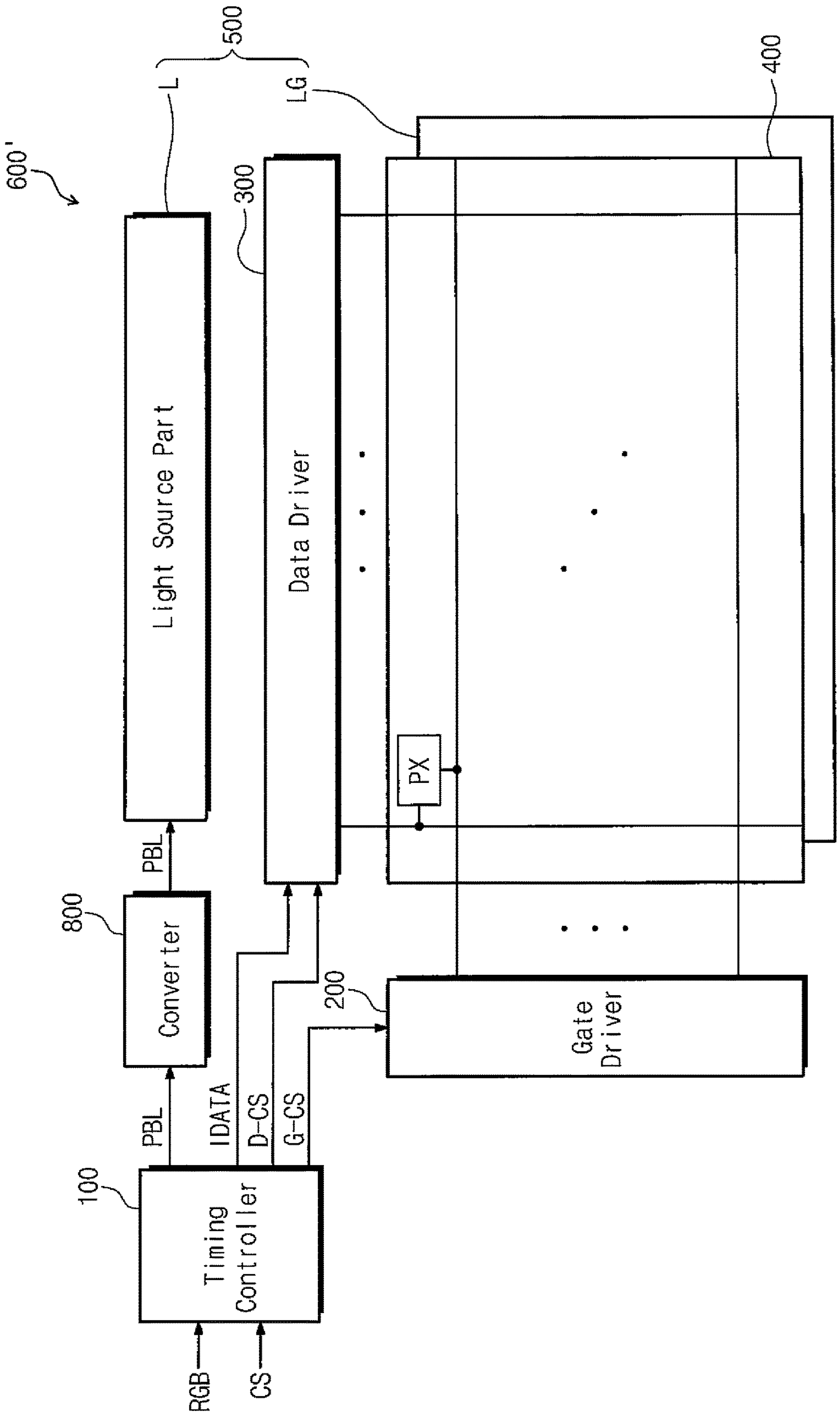
FIG. 8 is a block diagram showing a liquid crystal display device according to another exemplary embodiment of the present disclosure.

FIG. 8 is a block diagram showing a liquid crystal display device 600' according to another exemplary embodiment of the present disclosure.

The liquid crystal display device 600' shown in FIG. 8 has the same or substantially the same structure and function as those of the liquid crystal display device shown in FIG. 1, except for a converter 800.

Hereinafter, the converter 800 will be mainly described and details of other components may not be provided.

Referring to FIG. 8, the converter 800 receives the light source brightness data PBL from the timing controller 100, which are generated by converting the RGB signals RGB using the timing controller 100 and applies the light source brightness data PBL to the light source block L. In addition, the converter 800 may perform the frequency multiplying operation, which is performed by the timing controller 100 in FIG. 1. For instance, the converter 800 multiplies a fundamental frequency of a frame. That is, the converter 800 divides the frame into a first sub-frame to an N-th sub-frame in time and controls the light source block L to correspond to the first to N-th sub-frames.

It will be understood that, although the terms "first", "second", "third", etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section discussed below could be termed a second element, component, region, layer or section, without departing from the spirit and scope of the inventive concept.

It will also be understood that when a layer is referred to as being "between" two layers, it can be the only layer between the two layers, or one or more intervening layers may also be present.

The terminology used herein is for the purpose of describing particular embodiments and is not intended to be limiting of the inventive concept. As used herein, the singular forms "a" and "an" are intended to include the plural forms as well, unless the context clearly indicates otherwise. It will be further understood that the terms "include," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the inventive concept." Also, the term "exemplary" is intended to refer to an example or illustration.

It will be understood that when an element or layer is referred to as being "adjacent" another element or layer, it can be directly adjacent the other element or layer, or one or more intervening elements or layers may be present. When an element or layer is referred to as being "immediately adjacent" another element or layer, there are no intervening elements or layers present.

As used herein, the term "substantially," "about," and similar terms are used as terms of approximation and not as terms of degree, and are intended to account for the inherent variations in measured or calculated values that would be recognized by those of ordinary skill in the art.

As used herein, the terms "use," "using," and "used" may be considered synonymous with the terms "utilize," "utilizing," and "utilized," respectively.

The display device and/or any other relevant devices or components according to embodiments of the present invention described herein may be implemented utilizing any suitable hardware, firmware (e.g. an application-specific integrated circuit), software, or a suitable combination of software, firmware, and hardware. For example, the various components of the display device may be formed on one integrated circuit (IC) chip or on separate IC chips. Further, the various components of the display device may be implemented on a flexible printed circuit film, a tape carrier package (TCP), a printed circuit board (PCB), or formed on a same substrate. Further, the various components of the display device may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the scope of the exemplary embodiments of the present invention.

Although some exemplary embodiments of the present invention have been described, it is understood that the present invention should not be limited to these exemplary embodiments but various suitable changes and modifications can be made by one ordinary skilled in the art within the spirit and scope of the present invention as defined by the following claims and equivalents thereof.

What is claimed is:

1. A liquid crystal display device comprising:

a backlight comprising a light source configured to emit first to N-th block lights respectively during first to N-th sub-frames (N being a natural number equal to or greater than 1), in a first direction, the first to N-th sub-frames being obtained by dividing a frame in time, the light source facing a light incident surface of a light guide plate and being configured to emit the first to N-th block lights toward the light incident surface; and a display panel comprising pixels grouped into first to N-th row blocks along the first direction, the pixels being configured to display an image using the first to N-th block lights, and operations of the first to N-th row blocks being respectively synchronized with the first to N-th sub-frames, wherein, during the K-th sub-frame, a brightness of a K-th block light (K being a natural number equal to or greater than 1 and equal to or less than N) among the first to N-th block lights is determined on a basis of light source brightness data of a K-th row block among the first to N-th row blocks, wherein a travel direction of the first to N-th block lights emitted from the light source and an arrangement direction of the first to N-th row blocks are the same, wherein the first to N-th row blocks sequentially display an image, and wherein, during a K-th sub-frame from among the first to N-th sub-frames, the K-th row block displays an image and the pixels arranged in the row blocks, except for the K-th row block, are configured to display a black image.

2. The liquid crystal display device of claim 1, wherein the light source brightness data of the K-th row block comprise information about a highest brightness among brightnesses corresponding to pixels of the K-th row block.

3. The liquid crystal display device of claim 1, wherein the light source further comprises first to M-th light sources (M being a natural number equal to or greater than 1) arranged in a second direction substantially perpendicular to the first direction, the pixels being grouped into first to M column blocks along the second direction, wherein an L-th light source (L being a natural number equal to or greater than 1 and equal to or less than M) among the first to M-th light sources is configured to emit a light to an L-th column block among first to M-th column blocks, and wherein a brightness of a K-th block light of the L-th light source is determined on a basis of light source brightness data of a K-row-L-column pixel block defined corresponding to an area in which the K-th row block overlaps with the L-th column block.

4. The liquid crystal display device of claim 1, wherein the light source is spaced from one end of the display panel by a distance along the first direction, and the light source is configured to provide the first to N-th block lights to the one end of the display panel.

5. The liquid crystal display device of claim 4, wherein a first light source of the light source is spaced from the one end along a third direction opposite to the first direction, and is configured to emit the first to N-th block lights toward the one end in the first direction, and wherein a second light source of the light source is spaced from an other end facing the one end of the display panel along the first direction and is configured to emit the first to N-th block lights toward the other end in the third direction.

6. The liquid crystal display device of claim 1, further comprising first to N-th sub-gate drivers configured to apply gate control signals to the first to N-th row blocks, wherein, during the K-th sub-frame, the sub-gate drivers, except for a K-th sub-gate drivers among the first to N-th sub-gate drivers, are configured to apply a turn-off voltage to the row blocks, except for the K-th row blocks.

7. The liquid crystal display device of claim 1, further comprising first to N-th gate drivers configured to apply gate signals to the first to N-th row blocks and a data driver, wherein each of the first to N-th gate drivers is configured to apply a turn-on voltage to a corresponding row block of the first to N-th row blocks, and the data driver is configured to apply a black data voltage corresponding to the black image to the row blocks, except for the K-th row block, during the K-th sub-frame.

8. A method of driving a liquid crystal display device, the method comprising:

determining a brightness of a K-th block light (K being a natural number equal to or greater than 1 and equal to or less than N) among first to N-th block lights (N being a natural number equal to or greater than 1) on a basis of light source brightness data of a K-th row block among first to N-th row blocks of a display panel, the display panel being configured to display an image in a unit of first to N-th sub-frames during a K-th sub-frame among the first to N-th sub-frames, the first to N-th sub-frames being obtained by dividing a frame in time, and the first to N-th row blocks being arranged in a first direction;

emitting the K-th block light in the first direction to a light incident surface of a light guide plate disposed under the display panel during the K-th sub-frame; and displaying an image through the K-th row block utilizing the K-th block light during the K-th sub-frame, wherein a travel direction of the first to N-th block lights emitted from a light source and an arrangement direction of the first to N-th row blocks are the same, wherein the first to N-th row blocks sequentially display an image, and wherein, during a K-th sub-frame from among the first to N-th sub-frames, the K-th row block displays an image and the pixels arranged in the row blocks, except for the K-th row block, are configured to display a black image.

9. The method of claim 8, wherein the light source brightness data of the K-th row block comprise information about a highest brightness among brightnesses corresponding to pixels of the K-th row block.

10. The method of claim 8, wherein the displaying of the black image comprises applying, during the K-th sub-frame, a turn-off voltage to the row blocks, except for the K-th row block, utilizing gate drivers, except for a K-th gate driver among first to N-th gate drivers.

11. The method of claim 8, wherein the displaying of the black image comprises:

applying a turn-on voltage to each of the first to N-th row blocks utilizing first to N-th gate drivers; and applying a black data voltage corresponding to the black image to the row blocks, except for the K-th row block, utilizing first to N-th gate drivers during the K-th sub-frame.

* * * * *